United States Patent [19]

Koch et al.

[11] 4,221,374
[45] Sep. 9, 1980

[54] DEVICE FOR MOVING SHEET DATA CARRIERS FROM AND TO STACKS OF SHEETS

[75] Inventors: Harald Koch, Baierbrunn; Ludolf Haertenberger; Anton Hanoefner, both of Munich, all of Fed. Rep. of Germany

[73] Assignee: Siemens Aktiengesellschaft, Berlin & Munich, Fed. Rep. of Germany

[21] Appl. No.: 929,497

[22] Filed: Jul. 31, 1978

[30] Foreign Application Priority Data

Aug. 4, 1977 [DE] Fed. Rep. of Germany ....... 2735223

[51] Int. Cl.² ............................................. B65H 5/22
[52] U.S. Cl. ......................................... 271/4; 271/19; 271/21; 400/625; 400/628; 400/629
[58] Field of Search .................... 271/3, 4, 16, 17, 19, 271/21-23, 24, 25; 400/628, 629, 624, 625

[56] References Cited

U.S. PATENT DOCUMENTS

| 825,264 | 7/1906 | Dick | 271/22 |
|---|---|---|---|
| 3,669,327 | 6/1972 | Dowd | 226/11 |
| 3,857,558 | 12/1974 | Patel | 271/22 |
| 4,015,523 | 4/1977 | Evans | 101/233 |
| 4,089,402 | 5/1978 | Hyland | 400/629 X |

FOREIGN PATENT DOCUMENTS 1437478 5/1976 United Kingdom ...................... 271/21

Primary Examiner—Richard A. Schacher
Attorney, Agent, or Firm—Hill, Van Santen, Steadman, Chiara & Simpson

[57] ABSTRACT

A device for feeding sheets one at a time from a sheet storage to a printer mechanism and for receiving the sheets one at a time from the printer mechanism and storing them in a printed sheet storage area, the feeding and receiving sections being indepdendent of the operating mechanisms of the printer mechanism, and the feeding and receiving mechanisms including means to move a sheet edge beyond a decision threshold and to thereafter release the sheet in a manner allowing it to move either from the feeding mechanism to the printing device or from the printing device to the printed sheet storage.

7 Claims, 2 Drawing Figures

DEVICE FOR MOVING SHEET DATA CARRIERS FROM AND TO STACKS OF SHEETS

BACKGROUND OF THE INVENTION

1. Field of the Invention

This invention relates to automatic one at a time sheet feed and withdrawal mechanisms for devices including business machines, data printers, and/or tele-printers.

2. Prior Art

Devices for moving data carrying sheets one at a time from the stack of sheets to a business machine and for receiving the sheets from the business machine and stacking them are known. A large number of such devices exist both for paper sheets and for cards. One particular problem which exists when dealing with stacks of sheets, such as a stack of paper, is the requirement of reliably separating the uppermost sheet from the stack and from the next sheet in the stack and conducting the sheet to a feed device for infeeding past a processing position. An additional problem area exists at the point where the data carrier is to be transferred from one feed device to the next feed device and particularly in the lateral guidance of the sheet along the guide track. Satisfactory alignment of the individual feed systems in a series of feed systems is of decisive importance to the extent that the output position of the sheet stack determines the further transportation path of the separated sheet.

Such data carrying sheets can, in fact, be reliably separated from one another by means of known devices. For example, in one type of known device, the upper most sheet of a stack of sheets can be lifted by a gripping device provided with a suction cup and can thereafter be fed to the next feed device. Although such devices are functional, they have a high initial cost. Another known device relies upon the use of friction drive for separation of the top sheet. These devices have an initial high cost for the guide tracks as well as for the mounting and positioning of the drive elements all of which are required to be relatively complex and precise in order to insure that the sheet will be positioned at the desired feed point with a relatively high degree of accuracy.

It would therefore be an advance in the art to provide an inexpensive, uncomplicated device for separating the uppermost sheet of a stack of sheets from the stack and delivering the sheet to a data processor or typewriter and for receiving the sheet from the data processor and stacking in a stack of processed sheets.

SUMMARY OF THE INVENTION

It is therefore the principal aim of this invention to provide a device for moving sheets, and particularly for separating a sheet from a stack of sheets which device can be readily adapted to a business machine, particularly a data printer or tele-printer, as a magazine therefore.

According to this invention a device fulfilling these requirements is provided which utilizes a friction drive means for transporting a sheet substantially vertically against gravitational forces across a decision threshold and which thereafter releases the sheet to fall, by gravitation, beyond the threshold on an opposite side thereof.

According to the above fundamental principal of operation of this invention, a device can be provided which serves to separate sheets from a stack of sheets which is characterized in that the lower end region of a substantially vertically arranged stack of sheets is held in place by a retaining strip which has a spring action and which serves as a decision threshold. A drive element is provided which picks up a top sheet from the stack covered by the retaining strip and moves the sheet upwards relative to the retaining strip adjacent the stack of sheets and thereafter with the bottom end of the sheet being positioned above the retaining strip, releases the sheet.

A device for stacking sheets within the scope of this invention is advantageously designed such a drive device having a portion coated with friction-connection-intensive material is provided opposite the retaining strip which serves as a decision threshold and adjacent a guide track which is substantially vertically positioned against gravitational forces. The drive device, in its starting position, includes a segmented flattened portion providing a gap between the retaining strip and the drive device. By use of the term friction-connection-intensive material, it is intended to cover that class of materials having a high coefficient of friction, particularly in comparison to paper. Such materials might, for example, be gum rubber or materials having a semi-tacky paper grabbing surface.

Devices for separating sheets and for stacking consecutively supplied sheets constructed according to the principals of this invention can be used as add on equipment for business machines, data printers or tele-printers without experiencing any substantial difficulties. It is particularly advantageous to utilize such devices in those machines which are used as output units for data processors. In devices of this type, the actual printing operation takes place automatically when the text to be printed is available in a stored form. Although printing is automatic, the sheet changing must either be semiautomatic, manual or, if completely automatic, rely upon extremely expensive sheet feed and retrieval devices. A sheet separating device according to this invention can, however, be easily attached to conventional typewriters above the paper infeed area and will be immediately functional without the necessity of providing extensive modifications to the existing typewriter. A feature of the invention is the fact that no special assignment or alignment of the drive elements of the paper separating device to the drive elements of the typewriter is required. Thus an important feature of the invention is the drive systems of the paper storage to typewriter feed supply and typewriter to printed storage receipt device do not act upon the paper at the same time the typewriter drive system is acting upon the paper. Thus the two drive systems are not coupled to one another.

The drive device of the paper separating device acts upon a sheet to draw it substantially vertically upwards with respect to the stack from the support strip which serves a decision threshold. Thereafter the drive device fully releases the withdrawn sheet so that the sheet drops downwardly and enters the supply channel of the typewriter solely by virtue of gravitational force without other disturbing influences. In the typewriter supply channel, the sheet can be aligned into the wedge shaped gap between the typewriter platen and the pressure rolls and can thereafter be gripped by the platen and conducted past the printing position in a known manner by mechanisms within the typewriter.

After the sheet has been processed by the typewriter and has been transported by the platen it will be introduced between the retaining strip of a stacking device and a flattened portion of the drive shaft. It will be moved in this space until frictional connection between the sheet and the platen is terminated. At that time, activation of the drive shaft of the stacking device to rotate it one full turn will cause the arcuate curved portion of the drive shaft to contact the paper kicking it upwardly away from the typewriter. The arcuate curved portion of the drive shaft is again coated with a friction-connection-intensive material. The paper will therefore be moved upwardly above a retaining strip which again serves as a decision threshold. The paper will then be allowed to drop, again by gravity, behind the retaining strip to a tray which serves as a completed document stack tray. In the preferred embodiment illustrated the retaining strip preferably has spring like properties so that it is capable of absorbing the pressure force from the drive shaft necessary for a friction grab of the paper by the drive shaft.

As will be apparent from the above description, the mode of transport of the sheet from an infeed stack past the platen of a typewriter to an output stack is such as to allow the individual drive means to be actuated entirely separately from one another thereby eliminating the need for any elaborate synchronization of such drive means.

In one preferred embodiment of a device according to this invention, the infeed stack tray is provided with a stop means at its upper edge such that a sheet moves upwards away from the bottom support strip will contact the stop means. As a result the sheet which is to be separated from the stack will be slightly bowed or corrugated and will consequently be separated from the next lower sheet in the stack. In one embodiment the drive element for separating the sheet from the infeed sheet stack can consist of a drive shaft means whose periphery is coated with the necessary friction material and which has a segmented flattened portion. By utilizing the flattened portion, it can be assured that the gap is provided through which the sheet can pass having been separated from the underlying sheets to the end that the sheet can freely drop down and enter the infeed channel of the typewriter or other printing device.

In a modified form of the invention, the drive element can be provided by a driven rocker arm having a free end which in a first lifting phase frictionally contacts the sheet moving it upwardly and which, in further phase, is lifted away from the sheet allowing the sheet to drop freely from the stack area.

It is therefore a principal object of this invention to provide a stack paper infeed device for printers which employs an infeed paper stack tray positioned above a printer paper infeed, the tray having a bottom ledge spring member forming a decision threshold, and a means to lift a top paper upwardly beyond the threshold and to thereafter release the paper such that it falls by gravity beyond the threshold into the printer infeed.

It is another, and more specific object of this invention, to provide a combined paper infeed and receipt device for moving sheets of paper one at a time from an infeed stack to a printer and for receiving the sheets of paper one at a time from the printer and depositing them in an output stack with the stacks being positioned above the printer mechanism and with each of the stacks being provided with a drive means for moving a piece of paper above a decision threshold and thereafter dropping the paper by gravity past the threshold.

Other object, features, and advantages of the invention will be readily apparent from the following description of preferred embodiments thereof, taken in conjunction with the accompanying drawings, although variations and modifications may be effected without departing from the spirit and scope of the novel concepts of the disclosure, and in which:

DESCRIPTION OF THE PREFERRED EMBODIMENTS

Figure 1:
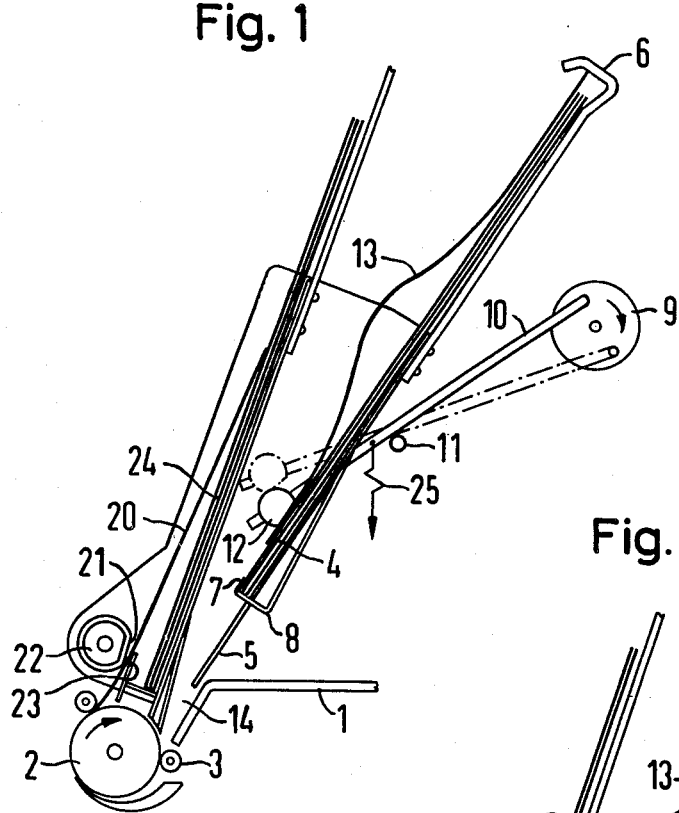
FIG. 1 is a fragmentary schematic end view of a device according to this invention employing a rocker arm paper separating drive means.

As schematically shown in FIG. 1 a printer device includes a housing 1 and a driven platen 2. The platen is utilized to drive a paper sheet past the printing mechanism. Pressure rollers 3 maintain the sheet in contact with the platen. Positioned above the printer is the device of this invention which accommodates the initial paper feed stack and which separates single sheets therefrom for infeeding to the printer and which further serves to receive printed sheets from the printer and to stack them in a final product stack.

The feeding mechanism for infeeding from the sheet storage includes a tray or receiving device for receipt of a stack 4 of individual sheets which are to be separated. The separating device also includes a drive means for separating the individual sheets. The sheet storage includes a tray base bearing plate 5 bounded at the top by a stop means 6 and at the bottom by a support clip 8 which is spring biased to entrap the stack 4 between a lip 7 of the clip and the plate 5. The lip 7 and clip 8 form a support strip with the lip 7 serving as a decision threshold.

According to the embodiment of FIG. 1, the separating drive means includes an off center drive 9 pivotably attached to a rocker arm 10. Spring 25 biases the rocker arm with respect to fixed post 11 so that the free end 12 of the rocker arm is biased towards the paper stack. The drive 9 rotates in the direction of the arrow illustrated. The free end 12 of the rocker arm 10 is coated with a friction-connection-intensive material. The position of the bolt 11 relative to the drive 9 and the direction of rotation of the drive 9 is such that the free end 12 follows a curved path upon rotation of the drive means. Thus, when the free end 12 of the rocker arm 10 moves upwards it rests on the top most sheet 13, of the stack 4 which is to be separated. Thus, with the upward movement of the free end 12 the sheet 13 will be withdrawn upwards from beneath the support strip 7 and will be bowed outwardly as a result of contact with the stop means 6. During further rotation of the drive means 9 the rocker arm 10 will be rotated around the bolt 11 such that the free end 12 is lifted from the sheet thereby releasing the sheet. The sheet, once released, falls by gravity to the supply channel 14 of the printer mechanism and from the supply channel into the nip between the platen and the pressure rollers. By means other than the separating device, the sheet can now be aligned into the printing position. Such an alignment means can be those known to the art in typewriters and the like mechanisms. Preferably means are provided to terminate rotation of the drive 9 so as to maintain the free end 12 raised above the stack 4 until a new sheet is to be separated. When a new sheet is to be infed to the printer, the free end 12 of the rocker arm will be moved downwardly in the raised position due to the positioning of the drive means and pin 11. Thus, it will again pick up the next sheet adjacent the bottom of its stroke. The lip 7 forms the decision threshold such that when the bottom end of a sheet is lifted above the lip 7, the lip will be drawn against the next underlying sheet due to the spring nature of the clip 8. Therefore when the sheet 13 is released from the free end 12, it will fall to the other side of the lip 7.

Figure 2:
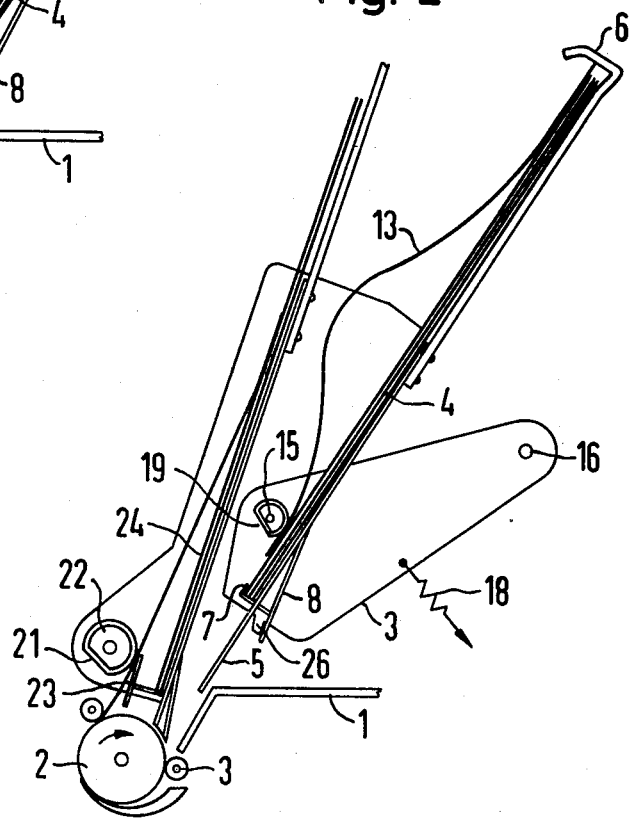
FIG. 2 is a view similar to FIG. 1 wherein the paper separating drive means utilizes a rotatable segmented flattened drive shaft.

FIG. 2 illustrates a modified form of the drive utilizing a driven shaft 15 mounted on a rocker 17 pivotable about an axis 16. A spring bias 18 urges the rocker 17 in the direction of the stack 4 such that a stop 26 on the rocker arm contacts a projecting portion of the clip 8. By this means the shaft 15 is positioned a given distance from the data carrier 13 which lies at the top of the stack 4. The periphery of the drive shaft 15 is again coated with the heretofore mentioned coating. The drive shaft 15 is also provided with a segmented flattened portion 19. When the drive shaft is rotated counter clockwise, the top most sheet will be moved upwardly beyond the lip 7 and will again be bowed or looped outwardly as a result of contact with the stop 6. When the drive shaft continues its rotation to the point where the flattened portion 19 is opposite the sheet 13, the sheet will be released and the sheet can then drop freely in the gap between the stack and the flattened face 19. Rotation of the drive shaft 15 is stopped in that position. Thus, gravitational forces will allow the sheet 13 to drop past the decision threshold formed at the lip 7 and into the nip between the platen and pressure roller from where it will be gripped between the platen and pressure roller and further transported to the printing area.

As the sheet has been completed, it will be passed around to the other side of the platen. The printed sheet 20 will then be transported vertically upwards between a drive shaft 22 and a retaining strip 23. The retaining strip 23 again serves as a decision threshold. The drive shaft 22 is again flattened having a flat surface portion 21 which provides a gap between the strip 23 and the surface of the drive shaft 22. The platen 2 will continue to move the paper until such time as the friction drive connection between the platen and the paper is lost. At that point, in order to deposit the sheet in the printed sheet storage 24, the drive shaft 22 is rotated counter clockwise so that its periphery, again coated with the friction-connection-intensive material, contacts the printed sheet 20 moving it upwardly against the strip 23. By positioning the axis of the drive shaft 22 adjacent or slightly above the top of strip 23, the paper will be moved above the top of strip 23 from which point it will be free to drop behind the strip 23 into the printed sheet storage 24. Again the paper drops beyond the decision threshold 23 by means of gravity.

In the preferred embodiment, the retaining strip 23 has spring properties and is positioned with respect to the drive shaft 22 such that the gap formed between the spring 23 and the segmented flattened portion 21 of the drive shaft 22 is sufficient to allow the printed sheet 20 to move freely upwardly under the influence of the platen 2. The spacing between drive shaft 22 and the strip 23 is such that the periphery of the drive shaft 22 other than the flattened portion 21 will bias the sheet 20 against the spring strip 23 with a pressure force sufficient for the paper to be moved upwardly upon rotation of the drive shaft 22.

As will be appreciated from a review of the above described two embodiments, the sheet separating and stacking devices according to this invention can be controlled to operate relatively independantly, mechanically speaking, from the printer mechanism so that the devices can be constructed as simple magazine type add on mechanisms for existing printing mechanisms.

Although the teachings of our invention have herein been discussed with reference to specific theories and embodiments, it is to be understood that these are by way of illustration only and that others may wish to utilize my invention in different designs or applications.

We claim as our invention:

1. A paper handling device for typewriters and the like comprising a sheet storage means positionable above a typewriter having a sheet supporting surface at an angle to the horizontal, decision threshold means adjacent a bottom of the storage means and affixed thereto, sheet movement means having a friction surface opposite the supporting surface, means for moving the friction surface relative to a sheet positioned adjacent the storage means to frictionally contact and move the sheet upwardly away from the decision threshold means to a point where a bottom of a sheet is positioned above the decision threshold means, means releasing the friction contact whereby the sheet drops by gravity past the decision threshold means, two paper handling devices being provided positioned above a typewriter with one of the paper handling devices providing a single sheet infeed for said typewriter for supplying sheets one at a time from sheets in the associated sheet storage means and wherein another of the paper handling devices comprises sheet storage means for storing processed sheets exiting from said typewriter, each of said paper handling devices having a sheet movement means associated therewith.

2. A device according to claim 1 wherein the decision threshold of each of the handling devices comprises a lip member positioned adjacent a bottom of the storage means in a spaced relation to the sheet supporting surface.

3. A device according to claim 2 wherein the sheet movement means for the paper handling device for supplying sheets one at a time to the printer comprises friction surface means spaced above the associated decision threshold and the means for moving is effective to move the friction surface to contact a surface of a top sheet in the sheet storage means and to thereafter move the top sheet vertically beyond the decision threshold and to thereafter release the friction surface from the contact with the top sheet.

4. A device according to claim 3 wherein the sheet storage means has a fixed stop member at an upper end thereof abutable by an upper end of a sheet moved by the associated sheet movement means.

5. A device according to claim 3 wherein the paper handling device receiving processed sheets from the typewriter has sheet movement means including a drive shaft positioned adjacent the decision threshold, the drive shaft having a high friction surface, the drive shaft having a flattened segment extending along an axial length thereof, the drive shaft positioned with respect to the decision threshold such that when the flattened portion of the drive shaft lies opposite the decision threshold a gap is provided between the decision threshold and the drive shaft, remaining portions of the drive shaft circumferentially of the flattened portion effective to bias a sheet against a lip of the decision threshold, the gap positioned with respect to the typewriter to receive a sheet of paper exiting the typewriter, the sheet supporting surface lying on an opposite side of the decision threshold from the drive shaft.

6. In a device for separating sheets one at a time from a stack of sheets and for infeeding the separated sheets to a printing means, the improvement of a frictional surface sheet drive means, means for engaging the frictional surface with a sheet to be separated from a stack of sheets, means for moving the frictional surface relative to the sheet to cause movement of the sheet relative to the stack from a rest position to one side of a decision threshold means to a position above the decision threshold means, means for releasing the contact between the frictional surface and the sheet, means allowing the sheet to fall freely by gravity from the position above the decision threshold past the decision threshold on a side of the decision threshold opposite the rest position, the decision threshold comprises a support strip, said support strip having spring properties, a paper stack adjacent one side of the support strip, the support strip positioned at a bottom region of the paper stack, the friction surface drive means effective to move a top sheet of said paper stack to a position above the support strip and to thereafter release the sheet, the paper stack is supported substantially vertically with the support strip adjacent the bottom of the paper stack and a stationary stop means positioned adjacent a top of the paper stack and whereby the drive means moves the top sheet against the stop means with a bottom edge of the sheet lying above the support strip, the drive means is a rotatable drive shaft having an axis substantially parallel to the plane of the paper stack, the shaft having a flattened portion extending along an axial length thereof, the drive shaft being coated with a friction coating, the flattened portion providing a gap between the drive shaft and an opposed surface sufficient to allow a sheet to pass freely therebetween.

7. In a device for separating sheets one at a time from a stack of sheets and for infeeding the separated sheets to a printing means, the improvement of a frictional surface sheet drive means, means for engaging the frictional surface with a sheet to be separated from a stack of sheets, means for moving the frictional surface relative to the sheet to cause movement of the sheet relative to the stack from a rest position to one side of a decision threshold means to a position above the decision threshold means, means for releasing the contact between the frictional surface and the sheet, means allowing the sheet to fall freely by gravity from the position above the decision threshold past the decision threshold on a side of the decision threshold opposite the rest position, the decision threshold comprises a support strip, said support strip having spring properties, a paper stack adjacent one side of the support strip, the support strip positioned at a bottom region of the paper stack, the friction surface drive means effective to move a top sheet of said paper stack to a position above the support strip and to thereafter release the sheet, the paper stack is supported substantially vertically with the support strip adjacent the bottom of the paper stack and a stationary stop means positioned adjacent a top of the paper stack and whereby the drive means moves the top sheet against the stop means with a bottom edge of the sheet lying above the support strip, the drive means includes a rocker arm pivotably attached off center to a rotatable device at one end of the rocker arm, a friction coating adjacent the free end of the rocker arm opposite the one end and a pivot fulcrum intermediate the ends with means biasing the free end towards the paper stack whereby in the first lifting phase of the drive means the free end will contact a top sheet of the paper stack and draw the same upwardly away from the support strip and in a further phase of the drive means will lift the free end away from the stack releasing the paper.

* * * * *